US008838581B2

(12) United States Patent
Tseng

(10) Patent No.: US 8,838,581 B2
(45) Date of Patent: Sep. 16, 2014

(54) SENDING NOTIFICATIONS ABOUT OTHER USERS WITH WHOM A USER IS LIKELY TO INTERACT

(75) Inventor: Erick Tseng, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 35 days.

(21) Appl. No.: 13/214,001

(22) Filed: Aug. 19, 2011

(65) Prior Publication Data
US 2013/0046770 A1 Feb. 21, 2013

(51) Int. Cl.
G06F 7/00 (2006.01)
G06F 17/30 (2006.01)
G06Q 30/00 (2012.01)
H04L 12/58 (2006.01)

(52) U.S. Cl.
CPC ........ *H04L 12/588* (2013.01); *G06F 17/30867* (2013.01); *G06F 17/3053* (2013.01); *G06Q 30/00* (2013.01)
USPC .......................................... 707/721; 705/319

(58) Field of Classification Search
None
See application file for complete search history.

(56) References Cited

U.S. PATENT DOCUMENTS

| | | | | | |
|---|---|---|---|---|---|
| 5,812,865 | A | * | 9/1998 | Theimer et al. | 709/228 |
| 5,814,798 | A | * | 9/1998 | Zancho | 235/380 |
| 7,071,842 | B1 | * | 7/2006 | Brady, Jr. | 340/988 |
| 2004/0181517 | A1 | * | 9/2004 | Jung et al. | 707/3 |
| 2005/0227676 | A1 | * | 10/2005 | De Vries | 455/414.1 |
| 2006/0085419 | A1 | * | 4/2006 | Rosen | 707/9 |
| 2006/0270419 | A1 | * | 11/2006 | Crowley et al. | 455/456.2 |
| 2007/0067271 | A1 | * | 3/2007 | Lu | 707/3 |
| 2007/0162569 | A1 | * | 7/2007 | Robinson et al. | 709/219 |
| 2007/0255807 | A1 | * | 11/2007 | Hayashi et al. | 709/219 |
| 2008/0040673 | A1 | * | 2/2008 | Zuckerberg et al. | 715/745 |
| 2008/0059576 | A1 | * | 3/2008 | Liu et al. | 709/204 |
| 2008/0133716 | A1 | * | 6/2008 | Rao et al. | 709/220 |
| 2008/0235084 | A1 | * | 9/2008 | Quoc et al. | 705/14 |
| 2008/0270220 | A1 | | 10/2008 | Ramer et al. | |
| 2009/0106040 | A1 | * | 4/2009 | Jones | 705/1 |
| 2009/0112781 | A1 | * | 4/2009 | Heath et al. | 706/21 |
| 2009/0119603 | A1 | * | 5/2009 | Stackpole | 715/753 |
| 2009/0144075 | A1 | | 6/2009 | Flinn et al. | |
| 2009/0164400 | A1 | * | 6/2009 | Amer-Yahia et al. | 706/45 |
| 2009/0204601 | A1 | * | 8/2009 | Grasset | 707/5 |
| 2010/0082693 | A1 | * | 4/2010 | Hugg et al. | 707/798 |
| 2010/0198768 | A1 | | 8/2010 | Zhou et al. | |

(Continued)

OTHER PUBLICATIONS

'Knowing me, Knowing you'—using profiles and social networking to improve recommednder systems, Bonhard et al, BT Technology, 24(3), Jul. 2006.*

(Continued)

*Primary Examiner* — Augustine K Obisesan
(74) *Attorney, Agent, or Firm* — Fenwick & West LLP

(57) ABSTRACT

To provide more contextually and temporally relevant information to its users, a social networking system may surface relevant information about a target user with whom an recipient user is likely to interact. The social networking system predicts whether the recipient user is likely to be in contact with a target user, either currently or in the near future. If contact is predicted, the system determines information about the target user that that the recipient user may find of interest for their interaction. To determine what information may be of interest, the system determines a relevance score for information items about that target user. The system can then use the relevance scores to decide whether and which information items to surface to the recipient user, e.g., in the form of notifications.

23 Claims, 4 Drawing Sheets

(56) References Cited

U.S. PATENT DOCUMENTS

2010/0217525 A1    8/2010  King et al.
2010/0281035 A1*  11/2010  Carmel et al. ................ 707/749
2010/0306249 A1   12/2010  Hill et al.
2011/0173190 A1    7/2011  Zwol et al.
2011/0258556 A1   10/2011  Kiciman et al.

OTHER PUBLICATIONS

"Make New Friends, but Keep the Old"—Recommending People on Social Networking Sites, Chen et al., Online Relationships, CHI, Apr. 4-6, 2009.*
On Social Networks and Collaborative Recommendation, Konstas et al., SIGIR, Jul. 19-23, 2009.*
Chat mining: Predicting user and message attributes in computer-mediated communication, Kucukyilmaz et al., Information Processing and Management, 44, pp. 1448-1466, 2008.*
You Are Who You Know: Inferring User Profiles in Online Social Networks, Mislove et al., WSDM, pp. 251-260, Feb. 4-6, 2010.*
Recommendation as Classification: Using Social and Content Information in Recommendation, Basu et al., Proceedings of AAAI, 1998.*
Inferring Private Information Using Social Network Data, Lindamood et al., WWW, pp. 1145-1146, 2009.*
Reality mining: sensing complex social systems, Eagle et al., Journal of Personal and Ubiquitous Computing archive, 10(4), pp. 255-268, 2006.*
Friends and neighbors on the Web, Adamic et al., Social Networks, 25, pp. 211-230, 2003.*
Modeling Relationship Strength in Online Social Networks, Xiang et al., WWW2010, pp. 981-990, Apr. 26-30, 2010.*
Predicting Tie Strength with social media, Gilbert et al., CHI 2009, pp. 211-220, Apr. 26-30, 2009.*
Patent Cooperation Treaty, International Search Report and Written Opinion, International Patent Application No. PCT/US2012/049027, Oct. 16, 2012, 11 Pages.

* cited by examiner

SENDING NOTIFICATIONS ABOUT OTHER USERS WITH WHOM A USER IS LIKELY TO INTERACT

CROSS REFERENCE TO RELATED APPLICATIONS

This application is related to U.S. patent application Ser. No. 12/977,027, filed on Dec. 22, 2010, the content of which is incorporated by reference herein in its entirety.

BACKGROUND

This invention relates generally to social networking, and in particular to surfacing dated but relevant information for a user of a social networking system based on social information.

Social networking systems have become prevalent in recent years because they provide a useful environment in which users can connect to and communicate with other users. A variety of different types of social networking systems exist that provide mechanisms allowing users to interact within their social networks. Social networks are particularly adept at organizing incoming social information and displaying the most relevant pieces of information to a user. Often, recently received social information is determined to be relevant to the user based on a current snapshot of the user's social information, taken at the time the social information is received. While many pieces of social information may be relevant to the user, many of them are not of interest at the instant in time when they are received by the social networking systems, but rather at some point later in the future.

Further, although social networking systems are adept at organizing and presenting recently provided relevant information, they are not designed to surface information regarding other particular users given the user's current circumstances.

SUMMARY

To provide more contextually and temporally relevant information to its users, a social networking system communicates relevant information about a target user to other recipient users who are likely to be interested in that information at the time of the communication or at some time in the near future. The recipient user may be selected based on whether the recipient user is going to interact with the target user in the near future or is currently doing so. The information about the target user provided to the recipient user may be selected to assist the recipient user in the interaction with the target user. For example, if the target user is scheduled to interview the recipient user, the information may provide the recipient user with information about the target user's interests, personal history, or a recent life event, any of which may serve as conversation starters for the recipient user. In an alternative example, if the recipient user is attending a party with the target user, the information may indicate that they share a mutual friend. Accordingly, the information about the target user may be relevant to the predicted interaction itself or just relevant to the target user.

In one embodiment, the social networking system predicts whether the recipient user is likely to be in contact with one or more target users, either currently or in the near future. If the recipient user is predicted to be in contact with a particular target user, the system determines information about the target user that that the recipient user may find of interest for their upcoming interaction with the target user. To determine which information to provide, the system may determine a relevance score for various candidate information items about that target user. The system can then use the relevance scores to decide whether and which information items to communicate to the recipient user, e.g., in the form of notifications.

Relevance scores for information items about a target user may be based on a number of factors. For example, some types of information may be generally considered by the social networking system to be of greater general interest than other types of information. For example, a notice that the target user has recently become engaged may be considered more noteworthy than the fact that the target user was recently tagged in a photo. Thus, each type of information may have associated with it an "occurrence type value" indicating a judgment of the general level of interest for information of that type.

Relevance scores may be also based on the target user's specific interests, independent of the general consensus on the type of the information. For example, if the target user is an avid Josh Whedon fan, information items related to Josh Whedon might have a higher relevance score for the target user than they would for the average user. Thus, each information item may have associated with it an "affinity value" indicating the target user's affinity for a particular information item.

Relevance scores may be further refined by the recipient user's own affinities, thereby allowing notifications to take into account the overlap of interests between the recipient user and the target user. To incorporate the recipient user's own interests, affinity values may be further adjusted or normalized into "inferred affinity values" based the recipient user's own interest in the information items of the target user.

In some cases, it is unnecessary to provide the recipient user with information about the target user that the recipient user is already aware of. For example, if target user has recently had a birthday, and the recipient user has already made use of the social networking system to congratulate the target user on their birthday, it may be unnecessary to later provide a reminder to the recipient user regarding that birthday. Thus, notifications regarding items of information which are relevant may be filtered or suppressed if an "overexposure value" indicates that the recipient user is already aware of the information.

Notifications may be provided to the recipient user at their request, or they may be pushed to the recipient user automatically by the social networking system. The social networking system may transmit notifications periodically or make use of the recipient user's previously expressed plans or calendared events to determine when to provide notifications.

DETAILED DESCRIPTION

Overview of a Social Networking System Network

Figure 1:
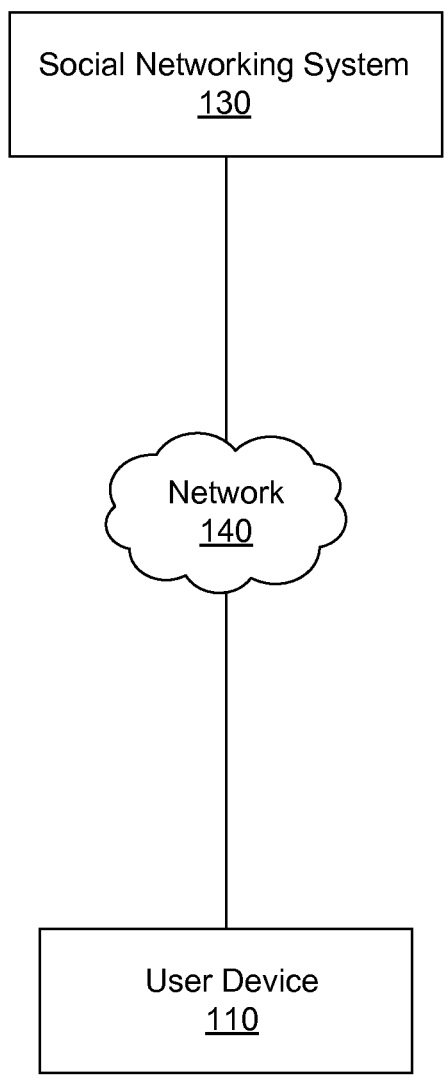
FIG. 1 is a network diagram of one embodiment of a system for providing a user of a social networking system with notifications regarding other users with whom they are likely to interact.

FIG. 1 is a network diagram of one embodiment of a system for providing a user of a social networking system with notifications regarding other users with whom they are likely to interact. The system 100 includes one or more user devices 110, the social networking system 130 and a network 140. For purposes of illustration, the embodiment of the system 100 shown by FIG. 1 includes a single user device 110. However, in other embodiments, the system 100 may include more user devices 110. The social networking system 130 provides a platform, or backbone, which other systems may use to provide social networking services and functionalities to users across the Internet.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the social networking system 130 via the network 140, which may comprise any combination of local area and/or wide area networks, using both wired and wireless communication systems. In one embodiment, the user device 110 displays content from the social networking system 130.

The social networking system 130 comprises one or more computing devices storing a social network, comprising a plurality of users and providing users of the social network with the ability to communicate and interact with other users of the social network. According to various embodiments, the social networking system 130 may comprise a website, or alternatively a server that can be accessed through a wired or wireless network 140 by user devices 110. In use, users join the social networking system 130 and then add connections (i.e., relationships) to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

The social networking system 130 is also capable of linking a variety of entities. For example, the social networking system 130 enables users to interact with each other as well as receive content from third-party content object providers 120 or other entities, or to allow users to interact with these entities through an API or other communication channels. In addition to establishing and maintaining connections between users and allowing interactions between users, the social networking system 130 provides users with the ability to take actions on various types of information stored in the social networking system 130.

Social Networking System Architecture

Figure 2:
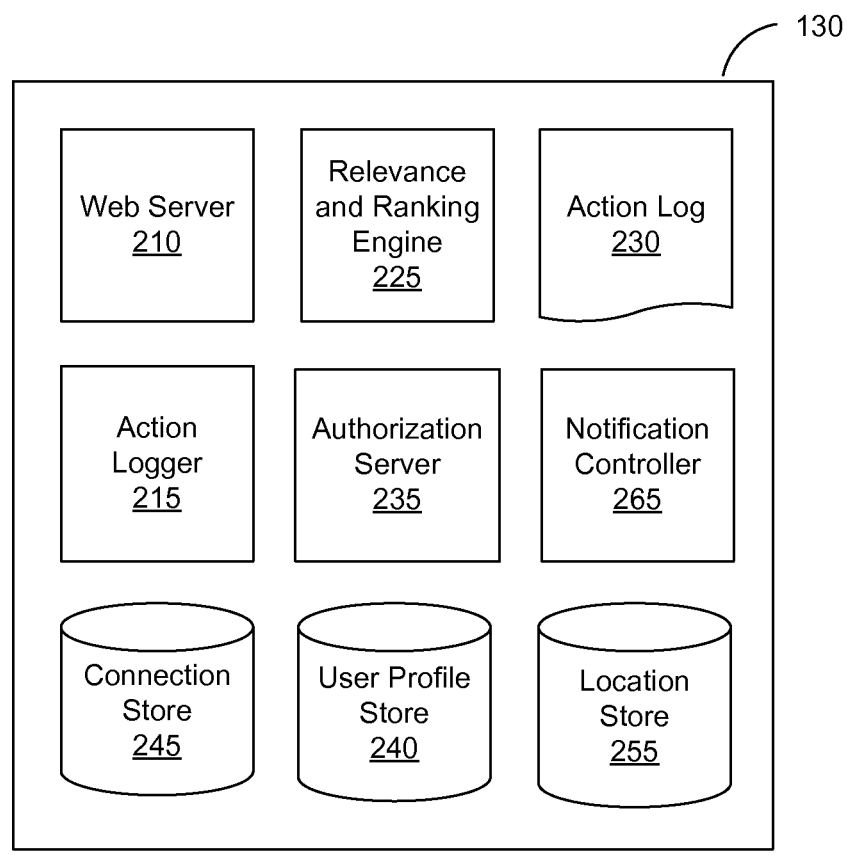
FIG. 2 is a diagram of a social networking system, in accordance with an embodiment of the invention.

FIG. 2 is a diagram of one embodiment of a social networking system 130. The embodiment of a social networking system 130 shown by FIG. 2 includes a web server 210, an action logger 215, an API request server 220, a relevance and ranking engine 225, a notification controller 265, an action log 230, an inference module 275, an authorization server 235, a user profile store 240, a connection store 245, and a location store 255. In other embodiments, the social networking system 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 allows users to communicate or otherwise interact with each other and access content as described herein. The social networking system 130 stores user profiles describing the users of a social network in a user profile store 240. The user profiles include biographic, demographic, and other types of descriptive information, such as work experience, educational history, hobbies or preferences, interests, location, and the like. For example, the user profile store 240 contains data structures with fields suitable for describing a user's profile. When a new information item of a particular type is created, the social networking system 130 initializes a new data structure, i.e., a "node" of the corresponding type, assigns a unique identifier to it, and begins to add data to it as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc. In one embodiment, user's interests may be explicitly specified in the user's profile or interests that may be inferred from the user's activities in the social networking system (e.g., uploaded content, postings, reading of messages, etc). Additionally, the user profile store 240 includes logic for maintaining user interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 130.

The social networking system 130 further stores data describing one or more connections between different users in a user connection store 245. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to third-party content object providers 120, or connections to other entities. The connection stores 245 may also associate a connection type with a user's connections, which may be used in conjunction with the user's privacy setting, to regulate access to information about the user. In addition, the connection store 245 may be accessed by other aspects of the social networking system 130.

The web server 210 links the social networking system to one or more user devices 110 via the network 140. The web server 210 serves web pages, as well as other web-related content, such as Java, Flash, XML, and so forth. The web server 210 may include a notification and/or mail server or other messaging functionality for receiving and routing messages between the social networking system 130 and one or more user devices 110. The messages can be instant messages, queued messages (e.g., email), text and SMS messages, or any other suitable messaging format.

The action logger 215 is capable of receiving communications from the web server 210 about user actions on and/or off the social networking system 130. The action logger 215 populates the action log 230 with information about user actions, allowing the social networking system 130 to track or monitor various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in the action log 230. In one embodiment, the social networking system maintains the action log 230 as a database of entries. When an action is taken within the social networking system 130, an entry for the action is added to the action log 230.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites or any entity that can potentially access the information. The information that can be shared by a user comprises user profile information like profile photo, phone numbers associated with the user, user's connections, actions taken by the user such as adding a connection, changing user profile information and the like.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content, groups, events, messages, concepts, and any other things that can be represented by the social networking system. An edge between two nodes in the social graph represents a particular kind of connection between the two nodes, which may result from an action that was performed by one of the nodes on the other node.

The social networking system 130 may receive a request to associate the web content with a node in the social networking system 130. An external website incorporates a tag into the markup language document for the web page(s) of the web content to claim ownership of the pages/domain in the context of the social networking system 130. In some cases, an entire domain or collection of web pages is associated with a unique identifier that associates the web pages with a node. Once established, the social networking system 130 tracks data associated with the node in the action log 230.

Data stored in the connection store 245, the user profile store 240 and the action log 230 allows the social networking system 120 to generate a social graph that uses nodes to identify various information items and edges connecting nodes to identify relationships between different items of information. An edge between two nodes in the social graph represents a particular kind of connection between the two nodes, which may result from an action that was performed by one of the nodes on the other node.

The notification controller 265 controls the transmission of notifications to the user device 110. Information may be pushed to the user device 110 as notifications, or information may be pulled to the user device responsive to a request received from the user device 110. Based on user engagement with the notifications, the notification controller 265 may adjust the rate in which notifications are provided to the user device 110. By adjusting the initial settings, the notification controller 265 provides notifications to the user device 110 when the user is more likely to engage with the notifications. Additionally, the information that is provided to the client device 110 may be updated based on the user engagement.

The location store 255 stores location information received from user devices 110 associated with users. The location information used by the social networking system 130 may be obtained directly from user devices 110, e.g., at the time a notification is to be sent or at various predetermined time intervals, or the location information may be a last stored location received from the user device 110. In addition, the location store 255 may receive updated location information, e.g., in response to a change in the location of a user device 110. In one embodiment, if an updated location is received, the updated location is provided to the relevance and ranking engine 225 for re-ranking and/or re-selecting the content objects in view of the updated location information.

Any information stored or represented by the social networking system may be characterized generally as information items. Information items may include, for example, user profile information, relationship information, recent or upcoming activity information, etc. A few specific examples include major life events such as graduation, marriage, or the birth of a child, as well as minor events such as changes in user location, check-ins, comments on other items in the social networking system, tags to photos and other day to day occurrences. These are just a few examples of the information items upon which a user may act on a social networking system, and many others are possible.

With respect to user profile information, further examples include anything a user can add, upload, send, or "post," to the social networking system 130. For example, a user communicates posts to the social networking system 130 from a user device 110. Posts may include data such as status updates or other textual data, location information, photos, videos, links, music or other similar data and/or media. Information items may also be added to the social networking system 130 by a third-party through a "communication channel," such as a newsfeed or stream.

With respect to upcoming activity information, further examples include information regarding things or activities of interest to the user. Examples include events (e.g., a New Year's Eve party), ad-hoc gatherings (e.g., an impromptu gathering of 100 people in Union Square, San Francisco). Other examples include movie show times, movie reviews, restaurant reviews, restaurant menus, product information and reviews, etc., as well as incentive such as coupons, discount tickets, gift certificates, etc.

Sending Notifications about Other Users with Whom a User is Likely to Interact

The social networking system provides to a user information about other users of the system with whom the user is likely to interact. To do this, the system predicts whether a recipient user is likely to be in contact with one or more target users, either currently or in the near future. If the recipient user is predicted to be in contact with a particular target user, the system determines information related to the target user that may be of use and/or of interest to the recipient user for their upcoming interaction. To determine what information to provide, the system determines a relevance score for one or more information items related to the target user. The information items with the highest relevance scores may be provided to the user in the form of notifications, either automatically or at their request.

Predicting Contact Between Users

In order to determine whether a recipient user is likely to be in contact with other users, the social networking system monitors the current conditions of the recipient user relative to one or more target users. The current conditions of the users may be monitored with respect to a number of factors including location, time, scheduled activities, or other metrics.

With regard to location, the social networking system receives and processes information regarding the current physical location of the recipient user and the target user. This information may be provided, for example, through location information provided by a user device 110, or alternatively through a user's active engagement with the social networking system. For example, active engagement by the user might include posting a check-in declaring the user's presence at a restaurant.

The social networking system determines that an recipient user and a target user are more likely to come into contact if they are physically closer together, and less likely to come into contact if they are physically farther apart. This might result, for example, in the transmission of notifications regarding information about a target user if the target user incidentally walks into the same coffee shop that the recipient user is currently present at.

The trigger for when to conclude that an recipient user and a target user are likely to interact based on location may have both fixed and continuous components. For example, a fixed component may activate if the target user and the recipient user are present within a maximum distance of each other. Alternatively, proximity value may incorporate a continuous component that increases in a continuous manner as the distance between the target user and the recipient user decreased in magnitude. Physical proximity information may be stored in location store 255.

Physical proximity is not necessarily the only trigger for determination of an expected meet up, however. An expectation of future contact may also be based on time. For example, if the recipient user and the target user are both expected to attend a mutual friend's party at a future point in time, as the current time gets closer to the start of the event, the system may predict that an interaction between the recipient user and the target user is imminent. Information regarding a user's plans may, for example, be drawn from each user's respective user profile store 240. As with physical proximity, the time component may include both fixed and continuous components for determining when to provide notifications.

Expectations of future contact between users are not limited to physical meet-ups where the recipient user and the target user are in the same location. For example, the recipient user and the target user may both be scheduled to be on the same teleconference call. If the teleconference call is imminent in time, this may trigger the transmissions of notifications to the recipient user regarding the target user.

Contact between two users of a social networking system may also be predicted based on both planned activities and spontaneous occurrences simultaneously. For example, if an recipient user goes on a lark to a particular bar with a group of friends, it may be determined that the target user also has a plan to be at that bar later in the night. The reverse situation is also possible, where the target user is incidentally at the location where the recipient user has a plan to be later in the day. Notifications may be provided to the recipient user when they enter the bar, which may be significantly earlier than when the target user arrives at the bar. As a result, notifications may be provided to recipient users user well in advance of an expected interaction.

Determining the Information to Provide

In order to determine which information to provide to the recipient user regarding a target user with whom the recipient user is expected to interact, the social networking system determines relevance scores for one or more information items associated with the target user in the social networking system. The relevance scores may be based on a number of factors. Once the relevance scores have been determined, the information items may be ranked by their relevance scores to determine which information items to provide as notifications to the user.

Some types of information may be considered of greater general interest than other types of information by the social networking system. For example, a change in a user's place of work may be considered of greater importance than their most recent status update. In order to determine relevance scores for different information items, each type of information may be assigned an occurrence type value to highlight those types of information items that are generally considered to be of greater interest to other users.

Although in one implementation, the occurrence type value is the same for all information items of the same type, the occurrence type value may also be determined on an individual item by item basis. For example, the location store 255 may indicate that five of the last six status updates from a particular target user were posted from a location in New York, and that the sixth update was posted from a location in Chicago. The Chicago status update may indicate that the target user has recently arrived in Chicago, possibly to move permanently, to take a vacation, or to go on a business trip. This last information item regarding the target user's presence in Chicago may be assigned an occurrence type value that is higher than the occurrence type value assigned to the New York status updates due to the significant in the target user's location. An recipient user living in Chicago might find the news that a target user is now in Chicago of interest, particularly if the target user has not been to Chicago recently.

Relevance scores may also be based on the target user's specific interests. An affinity value represents the degree to which a target user is interested in a particular item of information. For example, the affinity score might represent the target user's interest in running. Further, the relevance score may also take into account the overlap between the recipient user's interests and the target user's interest. For example, the affinity value might be modified into an inferred affinity value to take into account the target user's interest in running as well as the recipient user's interest in running Thus, the inferred affinity value has the capability of being unique between any two users of the social networking system.

In one implementation, to determine the affinity values for information items associated with a target user, the social networking system 130 accesses the target user's profile from the user profile store 240. Each user profile may have, associated with each information item, indications of the user's interest in that information item. These may be inferred based on the user's interactions with the social networking system 130, or explicitly provided by the user, for example. The social networking system 130 may also review an interest hierarchy indicated in the target user's profile. The interest hierarchy indicates an ordering of interests by the user. In one embodiment, the interest hierarchy may be explicitly provided by the user. The user may provide the hierarchy when establishing or updating his or her profile. Alternatively, the hierarchy may be determined based on the user's actions or behaviors in the social networking system 130. For example, the user may make frequent posts about "running" or variants thereof or upload content associated with "running" Accordingly, the social networking system 130 may determine the user has an interest for running in this example and update the user's profile with an indication of an interest in running.

The social networking system 130 may also determine the affinity value based on the commonality of interests between the recipient user and the target user. These affinity values may be referred to as "inferred" affinity values to delineate the distinction that they also take into account the interest of the recipient user. For example, the target user and recipient user may have a common interest of running. The target user may, further, have an interest for specific events related to running. For example, the target user may have a plan to run the Los Angeles marathon next month, or may have photos of themselves running the San Francisco half marathon. The inferred affinity value would weight recipient user's interest in the target user's plan to run the Los Angeles marathon by the recipient user's own interest in running. If the recipient user is not interested in running particularly, but is interested in sports in general, the affinity value may be slightly lower than if the recipient user were interested in running, to account for lower degree of connection between the two user's interest.

In some cases, the social networking system may predict that the recipient user is expected to encounter two different target users in the near future. This might be the case, for example, if the recipient user is attending a party and more than one target user is present at the party. In order to determine which information items to provide as notifications for each target user, the affinity values for information items may be weighted to account for the number of degrees of separation between the recipient user and each of the target users, with respect to their respective connections through the social networking system. For example, the greater the degree of separation between the recipient user and the target user in the social networking system 130, the lower weight that may be given to a particular target user's information items. The lower weight is indicative of the decreasing likelihood that the target user and the recipient user share an interest.

For example, if two users of a social networking system are friends, a weighting factor of 90% may be applied to the affinity value. If two users share mutual friends, the social networking system 130 may apply another weighting factor, such as 80%. As the degree of separation increases past the second order degree of separation, the weighting factor may stay the same, or decrease by another amount, for example 20%. For example, a third order degree of separation may cause the social networking system 130 to apply a weighting factor of 60% to the affinity value for information items.

The social networking system 130 may also weight the affinity values based on the type of connection between the recipient user and the target user. For example, "friendship" type connections may have a higher weight than "work colleague" type connections. Other connection types are possible as well, including acquaintance s and family type connections, for example.

Figure 3:
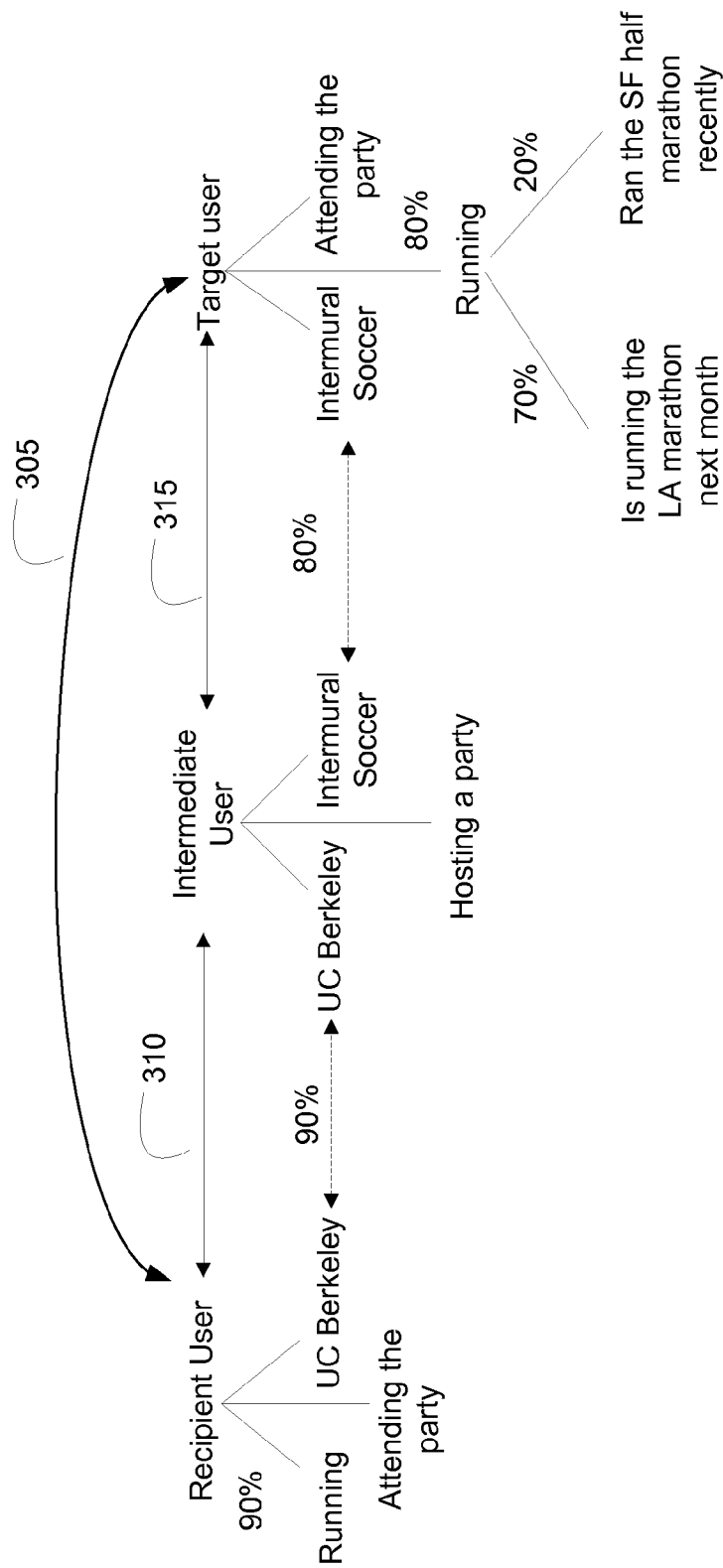
FIG. 3 illustrates example affinities between three connected users in an example social network, according to one embodiment.

FIG. 3 illustrates example affinity values between three connected users in an example social network, according to one embodiment. In the example social network, an recipient user is connected 310 with an intermediate user and is also connected 305 with a target user. The intermediate user and the target user are also connected 315. Each user has multiple information items associated with their user profiles.

The recipient user has three information items associated with their social graph: a sport type information item indicating the recipient user's interest in running, an education type information item indicating the recipient user's attendance at UC Berkeley, and an event information item indicating the recipient user's future attendance at the intermediate user's party. The intermediate user has three information items associated with their social graph: an education type information item indicating the intermediate user's attendance at UC Berkeley, a sports type information item indicating the intermediate user's interest in intramural soccer, and an event type information item indicating that the intermediate user is planning on hosting a party in the near future. The target user has a number of information items associated with their social graph: a sports type information item indicating the target user's interest in intramural soccer, a sports type information item indicating the target user's interest in running, and an event type information item indicating that the target user is also planning on attending the intermediate user's party. The running information item has two information items associated with it, an event type information item indicating that the target user is planning on running the L.A. marathon next month, and an event type information item indicating that the target user ran the S.F. half marathon recently.

In the example of FIG. 3, the affinity value may be determined for two information items of the target user relative to the recipient user. For the L.A. marathon information item, the weighting factor of 70% has been determined regarding the interest level of the target user for the information item. This weighting factor is taken in conjunction with the 80% weighting factor the target user's interest in running. In one example, the affinity value for the target user for the L.A. marathon information item is (0.7)(0.8)=0.56. The affinity value for the information item for the target user with respect to the recipient user further weights the affinity value by the degree of separation between the target user and the recipient user, in this example 90%, resulting in an affinity value of (0.9)(0.56)=0.504. The affinity value may further be determined as an inferred affinity value by incorporating the recipient user's own interest in similar topics, in this case running. The inferred affinity value by adding in the weighing factor for the running information item associated with the recipient user's profile, in this case 80%, resulting in an affinity value of (0.504)(0.8)=0.4032.

For the S.F. half marathon information item, the graph affinity value will be different, in this case affected by the relatively low weighting factor of 20%, resulting in an affinity value for the recipient user relative to the target user of (0.2) (0.8)(0.9)=0.144, and an inferred affinity value of (0.144) (0.9)=0.1296.

U.S. application Ser. No. 11/503,093, filed Aug. 11, 2006, describes techniques for computing affinity values for information stored in social networking system, the content of which incorporated by reference herein in its entirety.

If the recipient user is already aware of a piece of information about the target user, it may be unnecessary to remind the recipient user of that information. For example, if the recipient user has already made use of the social networking system to remark that they cannot wait to see the target user's new home, it may be unnecessary to remind recipient user that the target user has moved to a new home. Information items with high elevance scores may be filtered out or suppressed to take into account already known information in order to minimize the transmission of redundant notifications to the recipient user. To accomplish this, an overexposure value may be determined which indicates the degree to which the recipient user is already aware of a given information item. The overexposure value is generally higher when an information item has had relatively little prominence in the social networking system, and lower when an information item has had relatively more prominence.

The overexposure value for a target user's information item may be based on the number of other information items that reference the information item. For example, if the information item is a photo, a large number of comments on the photo may indicate that the recipient user is already aware of the photo, and therefore a lower overexposure value. The information items that contribute to the determination of the overexposure value may be limited. For example, the overexposure value may be limited to only considering posts by the recipient user in determining whether the recipient user is already aware of a given information item. For example, if the recipient user has commented on a photo of the target user, the overexposure value may be lower than if they have not, regardless of the number of other uses who have commented on the photo.

Alternatively, certain information items may be given more weight than others. For example, the overexposure value may weight more heavily information items that have been commented on by friends of the recipient user of the social networking system 130, versus items that have been contented on by user are not as closely connected with the recipient user. In another example, the overexposure value may weight comment type information items more strongly than basic affinity (i.e., "like") type information items, such that comments contribute to a creating a lower overexposure score than mere likes.

The relevance and ranking engine 225 determines the relevance score for each of a target user's information items. The relevance and ranking engine may determine relevance scores for one or more target users, possibly including every user with which the recipient user is directly connected. The relevance and ranking engine 225 is further configured to rank the information items according to their relevance scores. The relevance and ranking engine 225 is further configured to filter information items that the recipient user is already aware of. The determination of relevance scores may occur asynchronously with respect to the actions of the recipient user, or responsive to the actions of the user. In one implementation, the values contributing to the relevance scores are higher for information items that are more likely to be of interest to the recipient user, and are multiplied together to yield the relevance score.

Timing and Transmission of Notifications to the Recipient User

Once the relevance scores for information items have been determined, the relevance and ranking engine 225 communicates with the notification controller 265 indicating which information items are to be transmitted as notifications to the recipient user. The transmission of notifications to the recipient user, along with the determination of relevance scores for the underlying information items may occur at varying intervals, such as always at the beginning of a period during which a notification would ordinarily be served, or every X minutes during a period during which notifications will be served, or every X minutes all the time, only in response to a change in the location of the recipient user, etc.

Alternatively, the ranking of information items may occur as a result of user demand. The user may explicitly request a notification, which may trigger the ranking of information items by their relevance scores and the transmission of notifications. The request may be received in response to user selection of a "refresh" element included in a user application associated with the present disclosure. The request may also be implicit. For example, upon launching of the user application, a request may be automatically received for the ranking.

In cases where the relevance and ranking engine 225 is determining which information items to present to the user independent of their input, it is not always cost efficient to frequently recalculate the relevance scores of all content objects for all possible target users directly or indirectly connected to the recipient user, in order to prepare for the transmission of notifications. If the social networking system is determining relevance scores for many target users simultaneously, the determination of relevance scores may be cut short to save on processing resources. For example, the social networking system 130 may determine the relevance scores by traversing a path the social graph. If the relevance score for a given information item is below a threshold, the system stops traversing the path in order to save on resources. For example, if the relevance scores of information items of a mutual friend are below the threshold, the system does not compute the relevance scores of other users connected to the recipient user through the mutual friend.

Example Process

Figure 4:
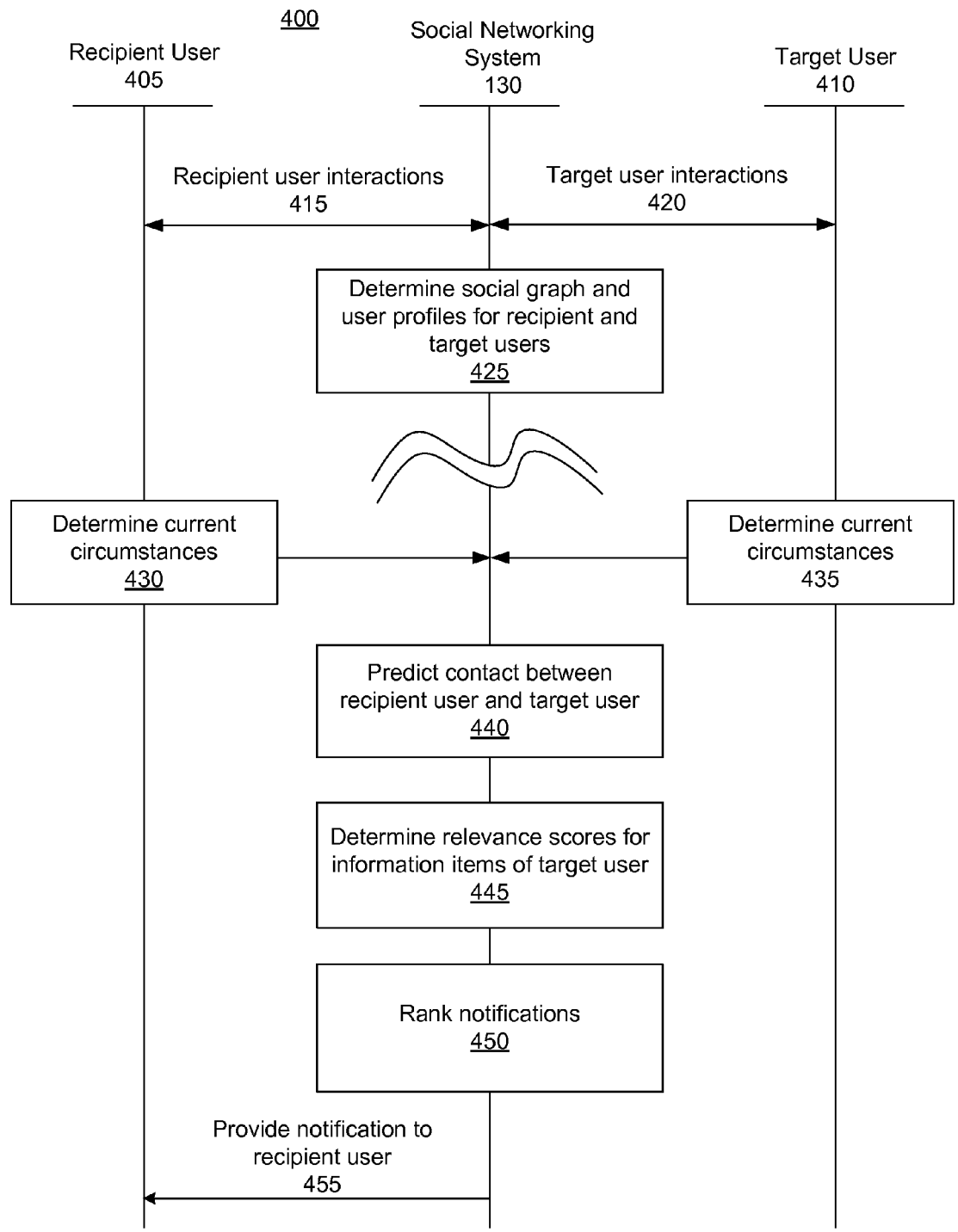
FIG. 4 is an interaction diagram of one embodiment of a process for providing a user of a social networking system with notifications regarding other users with whom they are likely to interact.

FIG. 4 is an interaction diagram of one embodiment of a process for providing a user of a social networking system with notifications regarding other users with whom they are likely to interact. The social networking system 130 collects user interactions from an recipient user 415 and one or more target users 420. The social networking system 130 incorporates 425 the interactions into each user's respective social graph and/or user profile, and based on the interactions between users, builds connections between the users of the social networking system.

The social networking system 130 determines information about the recipient user's 430 and target user's 435 current circumstances. For example, both may be planning to attend the same event close to the current time. Responsive to this determination, the social networking system 130 predicts 440 that the recipient user will come into contact with the target user. Responsive to this determination, the social networking system 130 determines 445 relevance scores for information items associated with the target user. The social networking system 130 ranks 450 the information items according to their relevance scores. The social networking system 130 then provides 455 one or more of the highest ranked information items to the recipient user as a notification.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining information for a plurality of users of a social networking system, the plurality of users comprising a recipient user and a target user;
   predicting an interaction between the recipient user and the target user based on a prediction that the recipient user and the target user are going to be at a same location at a future time;
   responsive to predicting the interaction between the recipient user and the target user:
      retrieving from the maintained information a plurality of information items containing information about the target user;
      determining a relevance score for each of the retrieved information items, wherein a higher relevance score indicates that the information item will assist the recipient user in the interaction with the target user;
      ranking the information items according to their relevance scores;
      selecting one or more information items based on the ranking to provide to the recipient user regarding the target user; and
      sending the selected information items for display to the recipient user.

2. The method of claim 1, wherein predicting the interaction between the recipient user and the target user comprises:
   receiving a current physical location of the recipient user and the target user; and
   determining that the recipient user's current physical location is within a distance of the target user's current physical location.

3. The method of claim 2, wherein the current physical location for a user of the social networking system is received from a user device associated with the user.

4. The method of claim 1, wherein predicting the interaction between the recipient user and the target user comprises:
   storing in the social networking system a scheduled activity for the recipient user and the target user, the scheduled activity comprising the future time; and
   determining that a current time is in close proximity to the future time.

5. The method of claim 1, wherein predicting the interaction between the recipient user and the target user comprises:
   storing in the social networking system a scheduled activity for the recipient user comprising the future time and an activity location;
   receiving a current physical location of the target user;
   determining that the current physical location of the target user is within a distance of the activity location; and
   determining that a current time is in close proximity to the future time.

6. The method of claim 1, wherein predicting the interaction between the recipient user and the target user comprises:

storing in the social networking system a scheduled activity for the target user comprising the future time and an activity location;

receiving a current physical location of the recipient user;

determining that the current physical location of the recipient user is within a distance of the activity location; and determining that a current time is in close proximity to the future time.

7. The method of claim 1, wherein the relevance score for the information item is determined based on an occurrence type value indicating a general consensus by the social networking system regarding a level of interest in information items of a type.

8. The method of claim 1, wherein the relevance score for the information item is determined based on an affinity value indicating the target user's interest in the information item.

9. The method of claim 1, wherein the relevance score for the information item is determined based on an inferred affinity value indicating a commonality of interest in the information item between the target user and the recipient user.

10. The method of claim 9, wherein the inferred affinity value is weighted based on a degree of separation between the recipient user and the target user in the social networking system.

11. The method of claim 1, further comprising filtering one of the information items from the selecting responsive to a determination that the recipient user is already aware of that information item.

12. The method of claim 1, wherein the information maintained by the social networking system includes a user-defined connection between the recipient user and the target user.

13. The method of claim 12, wherein the user-defined connection directly connects the recipient user and the target user in the social networking system.

14. The method of claim 1, wherein predicting the interaction between the recipient user and the target user comprises:

determining that it is likely that the recipient user and the target user will interact based the information maintained by the social networking system including on one or more of a current physical location of the recipient user and the target user, a scheduled activity for at least one of the recipient user and the target user, and a current time.

15. The method of claim 1, wherein the same location is a physical location.

16. The method of claim 1, wherein the same location is a same teleconference.

17. A method comprising:

maintaining information for a plurality of users of a social networking system, the plurality of users comprising an recipient user and a target user;

predicting an interaction between the recipient user and the target user based on a prediction that the recipient user and the target user are going to be at a same location at a future time;

responsive to predicting the interaction between the recipient user and the target user:

retrieving from the maintained information a plurality of information items containing information about the target user, and selecting an information item about the target user from the retrieved information items based on an recipient user's expected interest in the selected information item; and sending a notification to a device associated with the recipient user for display on the device, the notification comprising the selected information item.

18. The method of claim 17, comprising determining the recipient user's expected interest in the selected information item by determining a relevance score for the information item.

19. The method of claim 18, wherein the relevance score for the information item is determined based on an occurrence type value indicating a general consensus by the social networking system regarding a level of interest in information items of a type.

20. The method of claim 18, wherein the relevance score for the information item is determined based on an affinity value indicating the target user's interest in the information item.

21. The method of claim 18, wherein the relevance score for the information item is determined based on an inferred affinity value indicating a commonality of interest in the information item between the target user and the recipient user.

22. The method of claim 21, wherein the inferred affinity value is weighted based on a degree of separation between the recipient user and the target user in the social networking system.

23. The method of claim 17, further comprising filtering one of the information items from the selecting responsive to a determination that the recipient user is already aware of that information item.

* * * * *

UNITED STATES PATENT AND TRADEMARK OFFICE
CERTIFICATE OF CORRECTION

PATENT NO.        : 8,838,581 B2                                  Page 1 of 1
APPLICATION NO.   : 13/214001
DATED             : September 16, 2014
INVENTOR(S)       : Erick Tseng It is certified that error appears in the above-identified patent and that said Letters Patent is hereby corrected as shown below:

In the Claims
Column 15, line 39, insert --on-- between "based" and "the information".

Signed and Sealed this
Twenty-fifth Day of August, 2015

Michelle K. Lee
*Director of the United States Patent and Trademark Office*